United States Patent
Le et al.

(10) Patent No.: US 9,366,289 B2
(45) Date of Patent: Jun. 14, 2016

(54) FOLDED FLUID CHANNEL FOR A FLUID DYNAMIC BEARING MOTOR

(71) Applicant: SEAGATE TECHNOLOGY LLC, Cupertino, CA (US)

(72) Inventors: Lynn B Le, San Jose, CA (US); Alan Lyndon Grantz, Aptos, CA (US)

(73) Assignee: Seagate Technology LLC, Cupertino, CA (US)

( * ) Notice: Subject to any disclaimer, the term of this patent is extended or adjusted under 35 U.S.C. 154(b) by 154 days.

(21) Appl. No.: 14/158,585

(22) Filed: Jan. 17, 2014

(65) Prior Publication Data

US 2014/0133789 A1    May 15, 2014

Related U.S. Application Data

(63) Continuation of application No. 12/117,619, filed on May 8, 2008.

(51) Int. Cl.

| | |
|---|---|
| F16C 32/06 | (2006.01) |
| F16C 33/10 | (2006.01) |
| F16C 41/00 | (2006.01) |
| F16C 17/10 | (2006.01) |

(52) U.S. Cl.
CPC ........... *F16C 32/0633* (2013.01); *F16C 17/105* (2013.01); *F16C 17/107* (2013.01); *F16C 33/107* (2013.01); *F16C 33/1085* (2013.01); *F16C 41/008* (2013.01); *F16C 2370/12* (2013.01)

(58) Field of Classification Search
CPC .. F16C 17/107; F16C 2370/12; F16C 33/107; F16C 33/743
USPC .................. 384/100, 107, 114, 130, 119, 132
See application file for complete search history.

(56) References Cited

U.S. PATENT DOCUMENTS

| | | | |
|---|---|---|---|
| 5,791,784 A | 8/1998 | Ichiyama | |
| 7,726,882 B2 * | 6/2010 | Parsoneault et al. | 384/132 |
| 2004/0096131 A1 * | 5/2004 | Aiello et al. | 384/119 |
| 2004/0184688 A1 * | 9/2004 | Le et al. | 384/107 |
| 2004/0212921 A1 * | 10/2004 | Herndon et al. | 360/99.08 |
| 2004/0223673 A1 * | 11/2004 | Tiller et al. | 384/107 |
| 2004/0264819 A1 | 12/2004 | Weingord et al. | |
| 2006/0039636 A1 | 2/2006 | Ichiyama | |
| 2008/0260310 A1 * | 10/2008 | Bauer et al. | 384/107 |

* cited by examiner

*Primary Examiner* — William Kelleher
*Assistant Examiner* — Gregory Prather (57) ABSTRACT

An apparatus includes a stationary shaft and a sleeve rotatable with respect to the shaft. A fluid dynamic bearing is defined by the stationary shaft and the sleeve. A fluid channel includes a first axially extending portion in the fluid dynamic bearing, and a radially extending portion extending radially outward from the first axially extending portion. In addition the fluid channel includes a second axially extending portion extending axially downward from the radially extending portion. The apparatus further includes a pump seal including grooves formed in the second axially extending portion.

34 Claims, 5 Drawing Sheets

FOLDED FLUID CHANNEL FOR A FLUID DYNAMIC BEARING MOTOR

CROSS-REFERENCE TO RELATED APPLICATIONS

This application claims priority to co-pending U.S. application Ser. No. 12/117,619, filed May 8, 2008, titled "FOLDED FLUID CHANNEL FOR A FLUID DYNAMIC BEARING MOTOR."

BACKGROUND

Disc drive memory systems store digital information that is recorded on concentric tracks on a magnetic disc medium. At least one disc is rotatably mounted on a spindle, and the information, which can be stored in the form of magnetic transitions within the discs, is accessed using read/write heads or transducers. A drive controller is typically used for controlling the disc drive system based on commands received from a host system. The drive controller controls the disc drive to store and retrieve information from the magnetic discs. The read/write heads are located on a pivoting arm that moves radially over the surface of the disc. The discs are rotated at high speeds during operation using an electric motor located inside a hub or below the discs. Magnets on the hub interact with a stator to cause rotation of the hub relative to the stator. One type of motor has a spindle mounted by means of a bearing system to a motor shaft disposed in the center of the hub. The bearings permit rotational movement between the shaft and the sleeve, while maintaining alignment of the spindle to the shaft.

Disc drive memory systems are being utilized in progressively more environments besides traditional stationary computing environments. Recently, these memory systems are incorporated into devices that are operated in mobile environments including digital cameras, digital video cameras, video game consoles and personal music players, in addition to portable computers. These mobile devices are frequently subjected to various magnitudes of mechanical shock as a result of handling. As such, performance and design needs have intensified including improved resistance to shock events including axial and angular shock resistance, vibration response, and improved robustness.

The read/write heads must be accurately aligned with the storage tracks on the disc to ensure the proper reading and writing of information. Moreover, a demand exists for increased storage capacity and smaller disc drives, which has led to the design of higher recording areal density such that the read/write heads are placed increasingly closer to the disc surface. Precise alignment of the heads with the storage tracks is needed to allow discs to be designed with greater track densities, thereby allowing smaller discs and/or increasing the storage capacity of the discs. Because rotational accuracy is critical, many disc drives presently utilize a spindle motor having a fluid dynamic bearing (FDB) situated between a shaft and sleeve to support a hub and the disc for rotation. In a hydrodynamic bearing, a lubricating fluid is provided between a fixed member bearing surface and a rotating member bearing surface of the disc drive. Hydrodynamic bearings, however, suffer from sensitivity to external loads or mechanical shock. In particular, the stiffness of the fluid dynamic bearing is critical so that the rotating load is accurately and stably supported on the spindle without wobble or tilt. Further, with disc drive memory systems being utilized in progressively more environments including mobile environments, reduced power consumption by the motor is desired.

SUMMARY

An apparatus includes a stationary shaft and a sleeve rotatable with respect to the shaft. A fluid dynamic bearing is defined by the stationary shaft and the sleeve. A fluid channel includes a first axially extending portion in the fluid dynamic bearing, and a radially extending portion extending radially outward from the first axially extending portion. In addition the fluid channel includes a second axially extending portion extending axially downward from the radially extending portion. The apparatus further includes a pump seal including grooves formed in the second axially extending portion.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention.

A system and method are described herein for application to a fluid dynamic bearing motor. A fluid dynamic bearing is defined between a stationary component and a rotatable component. A shaft and a base structure are affixed to the stationary component. A first fluid sealing system is connected to a first axial end of the bearing, and a second fluid sealing system is connected to a second axial end of the bearing. The first fluid sealing system employs a first folded fluid channel and the second fluid sealing system employs a second folded fluid channel, wherein the first and the second folded fluid channels are defined by facing surfaces of the stationary component and the rotatable component. The first fluid sealing system forms an active pumping seal for pumping fluid when the stationary component and the rotatable component are relatively rotating. The first folded fluid channel is limited to occupying at least a portion of the same axial space as the bearing, and positioned radially outboard of the bearing. The first and the second folded fluid channels are shaped for maximizing bearing axial span and establishing angular stiffness to resist gyroscopic rocking of the facing bearing surfaces. By employing a rigid shaft design, the present invention exhibits significantly lower amplitude radial vibration responses at higher frequencies than prior art motor designs employing a rotating shaft design. An embodiment of the present invention employs a top cover attached shaft, and a single thrust surface, allowing for a rigid structure and power reduction in applications including high rotational speed disc drives.

It will be apparent that features of the discussion and claims may be utilized with disc drive memory systems, low profile disc drive memory systems, spindle motors, brushless DC motors, various fluid dynamic bearing designs including hydrodynamic and hydrostatic bearings, and other motors employing a stationary and a rotatable component, including motors employing conical bearings. Also, as used herein, the terms "axially" or "axial direction" refers to a direction along a centerline axis length of the shaft (i.e., along axis 260 of shaft 202 shown in FIG. 2), and "radially" or "radial direction" refers to a direction perpendicular to the centerline axis 260, and passing through centerline axis 260. Also, as used herein, the expressions indicating orientation such as "upper", "lower", "top", "bottom" and the like, are applied in a sense related to normal viewing of the figures rather than in any sense of orientation during particular operation, etc. These orientation labels are provided simply to facilitate and aid understanding of the figures as described in this Description and should not be construed as limiting.

Figure 1:
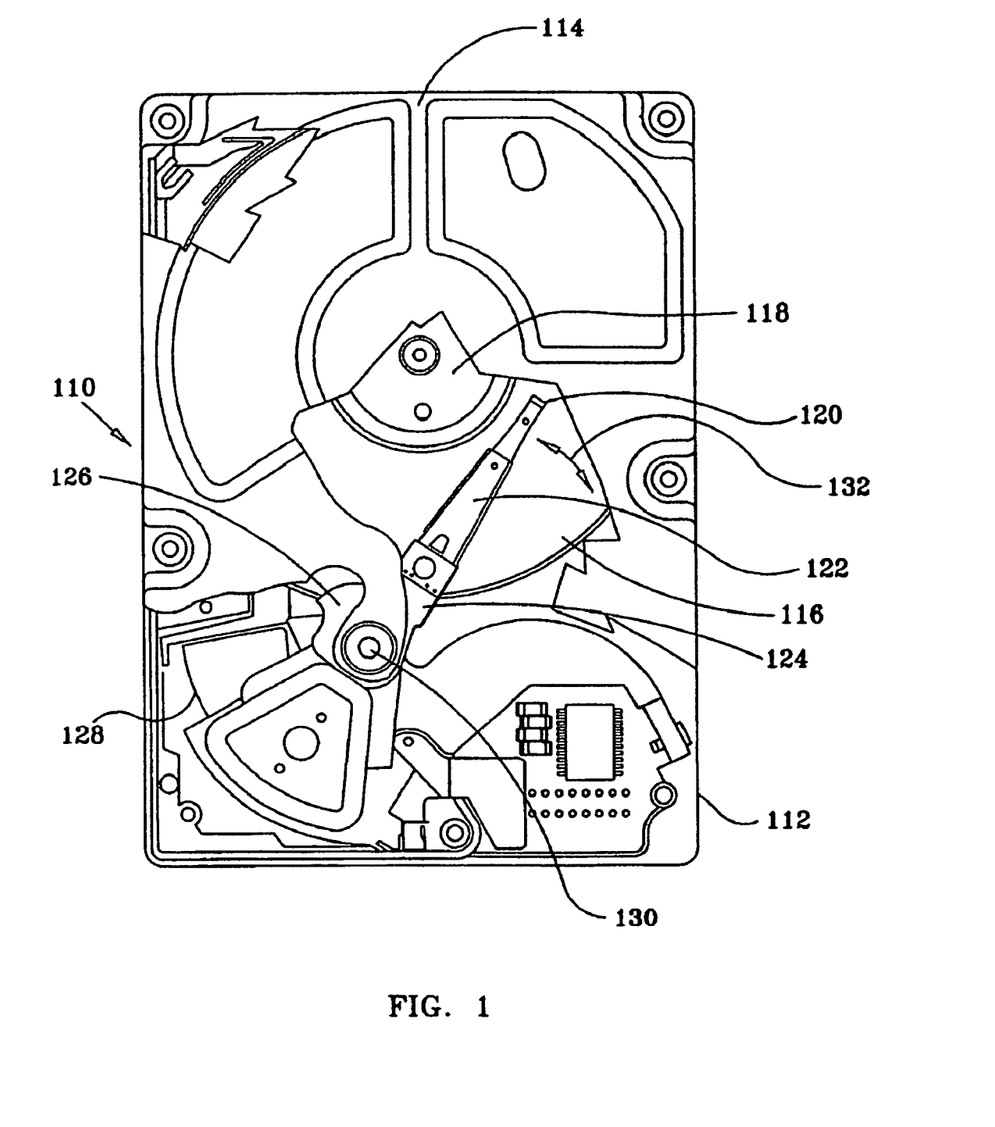
FIG. 1 is a top plan view of a disc drive data storage system in which the present invention is useful, in accordance with an embodiment of the present invention.

Referring to the drawings wherein identical reference numerals denote the same elements throughout the various views, FIG. 1 illustrates a top plan view of a typical disc drive data storage system 110 in which the present invention is useful. Clearly, features of the discussion and claims are not limited to this particular design, which is shown only for purposes of the example. Disc drive 110 includes base plate 112 that is combined with cover 114 forming a sealed environment to protect the internal components from contamination by elements outside the sealed environment. Disc drive 110 further includes disc pack 116, which is mounted for rotation on a spindle motor (as described in FIG. 2) by disc clamp 118. Disc pack 116 includes a plurality of individual discs, which are mounted for co-rotation about a central axis. Each disc surface has an associated read and write head 120, which is mounted to disc drive 110 for communicating with the disc surface. In the example shown in FIG. 1, heads 120 are supported by flexures 122, which are in turn attached to head mounting arms 124 of actuator body 126. The actuator shown in FIG. 1 is a rotary moving coil actuator and includes a voice coil motor, shown generally at 128. Voice coil motor 128 rotates actuator body 126 with its attached heads 120 about pivot shaft 130 to position heads 120 over a desired data track along arc path 132. This allows heads 120 to read and write magnetically encoded information on the surfaces of discs 116 at selected locations.

A flex assembly provides the requisite electrical connection paths for the actuator assembly while allowing pivotal movement of the actuator body 126 during operation. The flex assembly (not shown) terminates at a flex bracket for communication to a printed circuit board mounted to the bottom side of disc drive 110 to which head wires are connected; the head wires being routed along the actuator arms 124 and the flexures 122 to the heads 120. The printed circuit board typically includes circuitry for controlling the write currents applied to the heads 120 during a write operation and a preamplifier for amplifying read signals generated by the heads 120 during a read operation.

Figure 2:
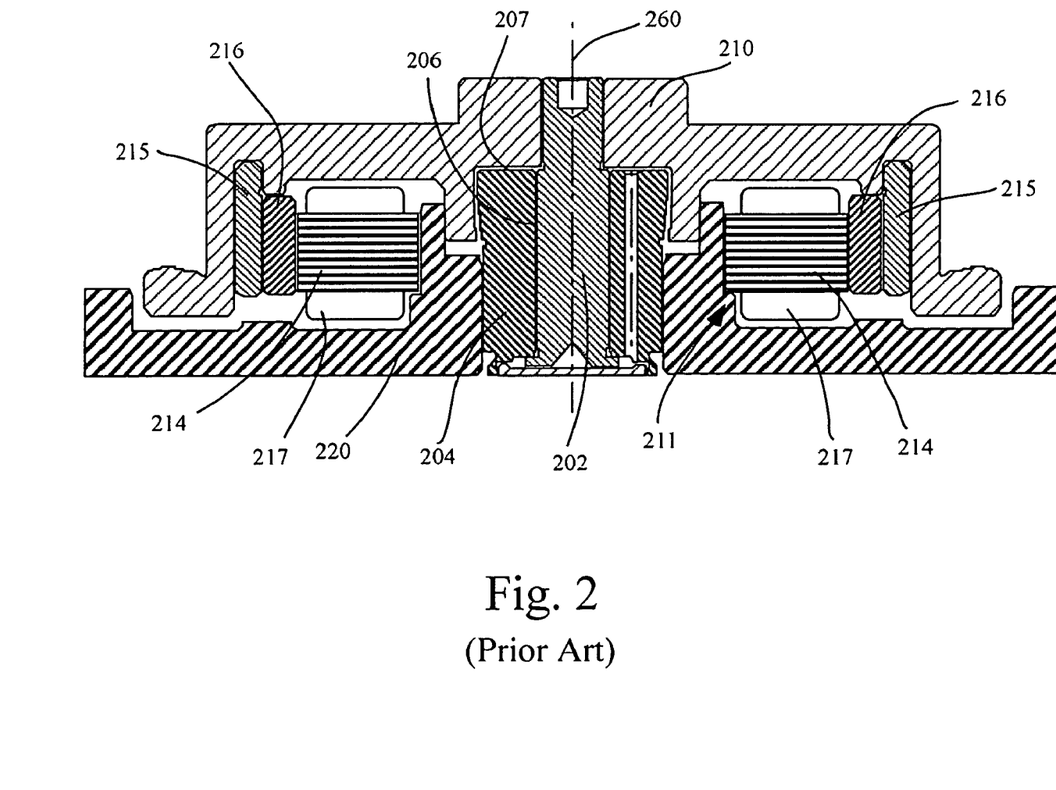
FIG. 2 is a sectional side view of a contemporary spindle motor used in a disc drive data storage system incorporating a rotatable shaft and stationary sleeve.

Referring to FIG. 2, a sectional side view is illustrated of a contemporary spindle motor as used in a disc drive data storage system 110, incorporating a base plate 220. This fluid dynamic bearing motor includes a rotatable component that is relatively rotatable about a stationary component, defining a journal bearing 206 therebetween. In this example, the rotatable components include shaft 202 and hub 210. Hub 210 includes a disc flange, which supports disc pack 116 (shown in FIG. 1) for rotation about axis 260 of shaft 202. Shaft 202 and hub 210 are integral with backiron 215. One or more magnets 216 are attached to a periphery of backiron 215. The magnets 216 interact with a lamination stack 214 attached to the base 220 to cause the hub 210 to rotate. Magnet 216 can be formed as a unitary, annular ring or can be formed of a plurality of individual magnets that are spaced about the periphery of hub 210. Magnet 216 is magnetized to form one or more magnetic poles. The stationary components include sleeve 204 and stator 211, which are affixed to base plate 220. Stator 211 is comprised of lamination stack 214 and stator windings 217. Bearing 206 is established between the sleeve 204 and the rotating shaft 202. A thrust bearing 207 is established between hub 210 and sleeve 204. Thrust bearing 207 provides an upward force on hub 210 to counterbalance the downward forces including the weight of hub 210, axial forces between magnet 216 and base plate 220, and axial forces between stator lamination stack 214 and magnet 216. In the case of a fluid dynamic bearing spindle motor, a fluid, such as lubricating oil fills the interfacial regions between shaft 202 and sleeve 204, and between hub 210 and sleeve 204, as well as between other stationary and rotatable components. While the present figure is described herein with a lubricating fluid, those skilled in the art will appreciate that useable fluids include a liquid, a gas, or a combination of a liquid and a gas.

Figure 3:
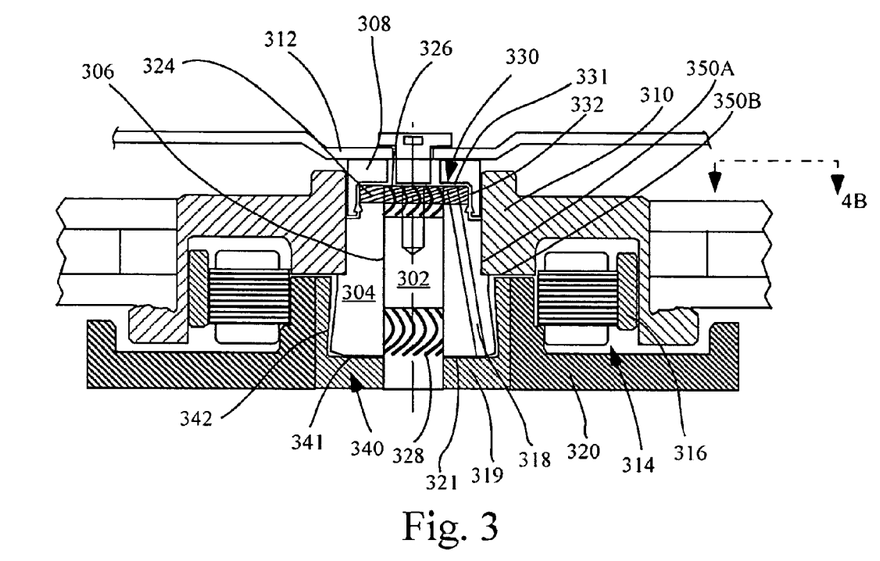
FIG. 3 is a sectional side view of a fluid dynamic bearing motor incorporating a fixed shaft and folded fluid channels, in accordance with an embodiment of the present invention.

Turning now to FIG. 3, a sectional side view is shown of a fluid dynamic bearing motor incorporating a fixed shaft 302 and folded fluid channels, in accordance with an embodiment of the present invention. A journal bearing 306 is defined between shaft 302 and sleeve 304, the shaft 302 and sleeve 304 positioned for relative rotation. As described in FIG. 2, magnet 316 interacts with stator 314 to cause the sleeve 304 and hub 310 to rotate. The shaft 302 is fixed to a base structure. Here, shaft 302 is fixed to base cup 319, and base cup 319 is fixed to baseplate 320. Alternatively, base cup 319 and baseplate 320 may be an integral component that is fixed to shaft 302. As used herein, "base structure" means a base cup, a baseplate, or an integral base cup and baseplate.

Fluid sealing system 330, comprising radially extending channel portion 331 and axially extending channel portion 332, forms an active pumping seal. An active pumping seal is defined herein as a type of fluid seal that builds pressure dynamically, and that employs active pumping when the shaft and the sleeve (or relatively rotatable components) are relatively rotating. The pressure is created by relative motion between the stationary and rotatable components. Fluid sealing system 330 is a folded fluid channel. A folded fluid channel is defined herein as including an axially extending channel portion and a radially extending channel portion. For example, radially extending channel portion 331 and axially extending channel portion 332 comprises a folded fluid channel. Fluid sealing system 340 is also a folded fluid channel, comprising radially extending channel portion 341 and axially extending channel portion 342. These channels 331, 332, 341 and 342 are defined by facing surfaces of a stationary component and a rotatable component.

The fluid sealing systems 330 and 340 are limited to occupying at least a portion of the same axial space as the bearing 306, and positioned radially outboard of the bearing 306. Thus, the fluid sealing systems 330 and 340 are shaped for maximizing axial span for bearing 306, and do not occupy axial space that bearing 306 could otherwise utilize. Also, by maximizing axial length for the bearing 306, angular stiffness is increased, and shaft 302 better resists gyroscopic rocking of the facing bearing surfaces.

In an embodiment, the bearing 306 employs asymmetric fluid sealing in which a grooved pumping seal is employed at fluid sealing system 330, and a capillary seal is employed at fluid sealing system 340. In another embodiment, a grooved pumping seal is employed at fluid sealing system 330, and grooves are situated on at least one of a facing surface of radially extending channel portion 331 (grooves 464 as shown in FIG. 4B), and a facing surface of axially extending channel portion 332 (grooves 324). In yet another embodiment, a capillary seal forms on a facing surface of axially extending channel portion 332 when the rotatable component is stationary. When the rotatable component is relatively rotating, a facing surface of radially extending channel portion 331 forms an active pumping seal.

Top grooves 326 and bottom grooves 328 are formed on shaft 302, although may alternatively be formed on the opposing facing surface of the sleeve. These asymmetric grooves may have a pattern including a herringbone pattern or a sinusoidal pattern inducing fluid flow in the interfacial region and generating a localized region of dynamic high pressure and radial stiffness. These grooves are situated at an upper and a lower axial portion of the journal bearing 306, separated by a separator region. In an embodiment, the bottom grooves 328 are formed with an asymmetric leg that is longer in length than an asymmetric leg of the top grooves 326. The extended leg of the top grooves 326 is formed with a length to limit or prevent negative pressure in the separator region. The extended leg of the bottom grooves 328 is formed to prevent reverse fluid circulation flow, when the fluid circulation is intended to flow upward from bottom grooves 328 toward top grooves 326. Also, less power is consumed by the motor by reducing the extended length of the top grooves 326 asymmetric leg.

The shaft 302 is attached to a top cover 312, for increasing rigidity of the shaft 302 and entire motor. By attaching the shaft 302 to the top cover 312, the cantilever gyro is substantially centered at an axial midpoint of the bearing 306, since the shaft 302 is attached at both axial ends. Also, by attaching a shaft to a top cover and to the motor baseplate, the radial and angular stiffnesses of a bearing structure are substantially increased over that of contemporary motor designs employing a rotating shaft in which the support for the bearing structure is attached only to a baseplate. Further, because the present invention shaft 302 is fixed and attached at both axial ends, the axial thickness of the base plate 320 and/or base cup 319 may be minimized without loss of structural rigidity.

A single thrust surface 321 is created by pressure generating grooves formed on at least one radially extending facing surface of the sleeve 304 and the motor cup 319 (or baseplate 320). These grooves provide pressure as the sleeve 304 rotates, and support the sleeve 304 and hub 310 for constant rotation.

A limiter 308 is employed to limit axial movement of the rotatable component with respect to the stationary component. In the example shown, the facing surfaces of the limiter 308 and the sleeve 304 limit the axial movement. The limiter component 308 is attached to, or in contact with, at least one of the shaft 302 and the top cover 312.

A recirculation passageway 318 is formed through the sleeve 304 for fluidly connecting the first axial end of the bearing at or near the fluid sealing system 330 with the second axial end of the bearing at or near the fluid sealing system 340. Fluid recirculation is further discussed in FIG. 5.

The sleeve 304 and the hub 310 (both rotatable components) have facing surfaces shaped with an axial step engagement 350A and a radial step engagement 350B, for affixing the sleeve 304 and the hub 310. Certainly, offset load capability and total indicated runout (TIR) are design concerns. In contemporary designs having a smaller engagement area, the joint at facing surfaces of the sleeve and hub may shift. The present invention utilizes both axial and radial engagement having lengthy surface areas, providing a stronger joint at the facing surface of the sleeve 304 and the hub 310.

Figure 4A:
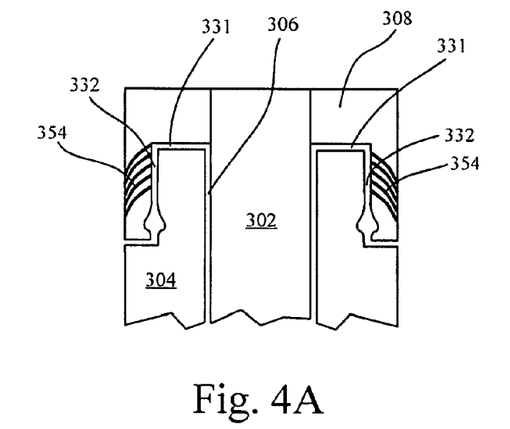
FIG. 4A is a sectional side view of an enlarged portion of the fluid dynamic bearing motor as in FIG. 3, illustrating details of a folded fluid channel and grooves, in accordance with an alternative embodiment of the present invention.
Figure 4B:
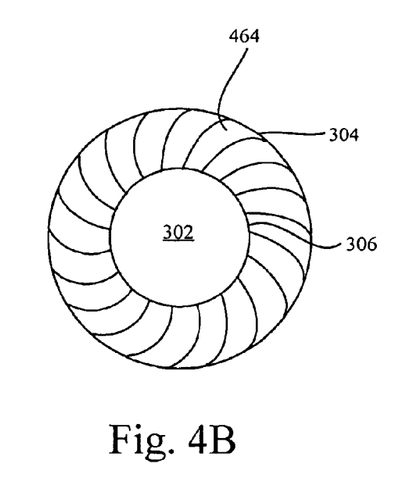
FIG. 4B is a top plan view of an enlarged portion of the fluid dynamic bearing motor taken from the reference 4B as shown in FIG. 3, illustrating grooves on a radially extending portion of a surface of the folded fluid channel, in accordance with an another embodiment of the present invention.

As illustrated in FIG. 4A, a sectional side view is shown of an enlarged portion of the fluid dynamic bearing motor as in FIG. 3, illustrating details of a folded fluid channel and grooves, in accordance with an alternative embodiment of the present invention. Grooves 354 are situated on the surface of the limiter 308 that faces sleeve 304 at axially extending channel portion 332. Alternatively, grooves may be formed on the sleeve 304 (grooves 324, FIG. 3). When the sleeve 304 is rotating, grooves 354 (or grooves 324) create an active pumping seal.

In an embodiment, grooves are formed on the axially extending channel 332, and the gap is increased at the radially extending channel 331 between the sleeve 304 and the limiter 308, resulting in reduced power consumption by the motor.

FIG. 4B is a top plan view of an enlarged portion of the fluid dynamic bearing motor taken from the reference 4B as shown in FIG. 3. Here, grooves 464 are employed on radially extending portion 331 of a surface of the folded fluid channel 330, in accordance with another embodiment of the present invention. As shown, spiral grooves 464 are formed on the axial top of sleeve 304 facing limiter 312. Alternatively, grooves may be employed on the limiter 312 facing the axial top of the sleeve 304. Grooves 464 form a grooved pumping seal within the fluid channel 330.

Figure 5:
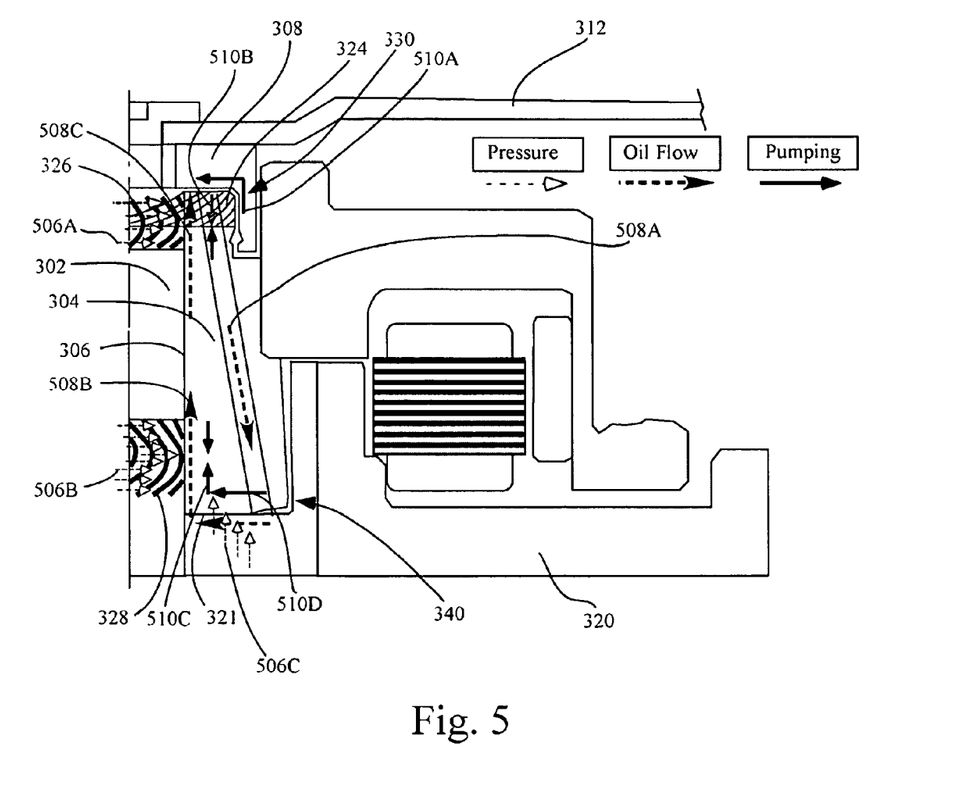
FIG. 5 is a sectional side view of an enlarged portion of the fluid dynamic bearing motor as in FIG. 3, illustrating pressure, oil flow and pumping details of the motor, in accordance with an embodiment of the present invention.

Referring to FIG. 5, a sectional side view is shown of an enlarged portion of the fluid dynamic bearing motor of FIG. 3, illustrating pressure, oil flow and pumping details of the motor, in accordance with an embodiment of the present invention. Bearing system 306 utilizes asymmetric fluid sealing in which a grooved pumping seal (a lower fluid volume and higher stiffness seal) is employed at fluid sealing system 330, and a capillary seal (a higher fluid volume and lower stiffness seal) is employed at fluid sealing system 340. That is, when the sleeve 304 is rotating relative to the shaft 302, grooves 324 (or alternatively, grooves 354 of FIG. 4A, or grooves 464 of FIG. 4B) create an active pumping seal forcing fluid as shown by arrow 510A. In an embodiment, when the sleeve 304 is stationary relative to the shaft 302, and centrifugal force subsides, a capillary seal forms on a facing surface of axially extending channel portion of fluid sealing system 330.

Thrust surface 321 provides an upward force (pressure 506C) separating the rotatable component and the stationary component, generates pumping pressure and drives fluid recirculation toward fluid bearing system 306, as shown by pumping arrow 510D to pump fluid as shown by oil flow arrow 508B.

Top grooves 326 generate a localized region of dynamic high pressure and radial stiffness (pressure 506A), and pump fluid as shown by arrows 510B. Similarly, bottom grooves 328 generate a localized region of dynamic high pressure and radial stiffness (pressure 506B), and pump fluid as shown by arrows 510C. The fluid flows through fluid bearing system 306 as shown by oil flow arrows 508B and 508C, and then through fluid recirculation passageway 318, formed through the sleeve 304, in the direction as shown by oil flow arrow 508A. Recirculation of the fluid purges any air within the journal bearing system 306.

Figure 6:
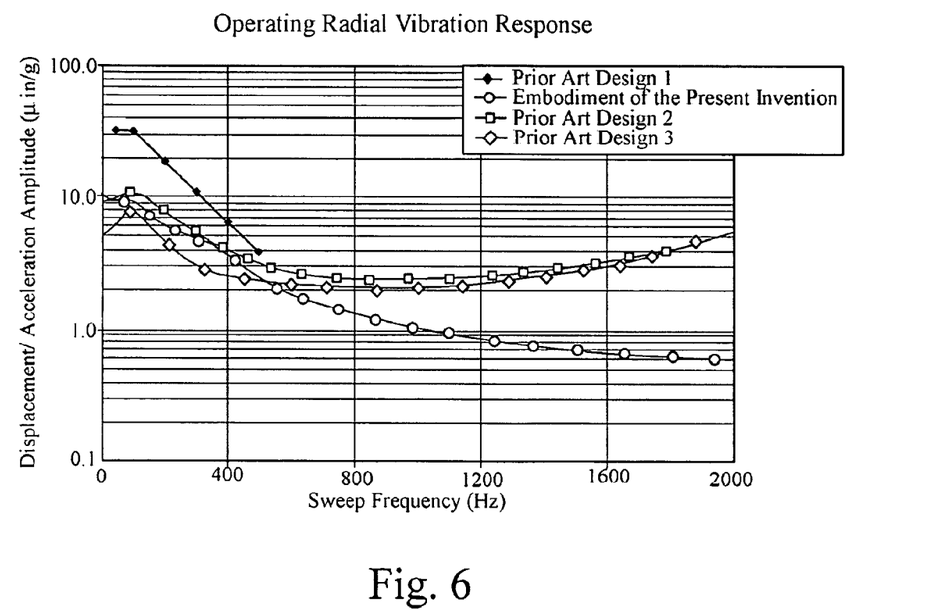
FIG. 6 is a graphical illustration of operating radial vibration response simulations for three prior art designs versus an embodiment of the present invention design, in accordance with an embodiment of the present invention.

FIG. 6 is a graphical illustration of operating radial vibration response simulations for three prior art designs versus an embodiment of the present invention design. Sweep frequency (Hz.) is plotted against displacement/acceleration amplitude (Mn/g). In the prior art designs, measurements of resonance modes excited from the spindle/disc rocking mode coincide with harmonics from the rotating shaft designs. As illustrated by the graph, an embodiment of the present invention (having a rigid structure) exhibits significantly lower amplitude responses at higher frequencies than prior art motor designs employing a rotating shaft design.

Modifications and variations may be made to the disclosed embodiments while remaining within the spirit and scope of the invention. The implementations described above and other implementations are within the scope of the following claims.

The invention claimed is:

1. An apparatus comprising:
    a stationary shaft;
    a sleeve rotatable with respect to the shaft;
    a fluid dynamic bearing defined by the stationary shaft and the sleeve;
    a fluid channel including,
        a first axially extending portion in the fluid dynamic bearing,
        a radially extending portion extending radially outward from the first axially extending portion, and
        a second axially extending portion extending axially downward from the radially extending portion, wherein the first axially extending portion and the second axially extending portion are both defined by a stationary component and a rotatable component; and
    a pump seal including grooves formed in the second axially extending portion.

2. The apparatus of claim 1, further comprising a capillary seal radially outside of the second axially extending portion, wherein the pump seal and the capillary seal are at opposite axial ends of the fluid channel.

3. The apparatus of claim 1, wherein the pump seal, a capillary seal, and the fluid dynamic bearing are positioned axially below the radially extending portion.

4. The apparatus of claim 1, further comprising a thrust bearing defined by the sleeve and a base cup.

5. The apparatus of claim 1, further comprising a recirculation passageway including,
    a first end radially inside of the pump seal, and
    a second end radially outside of a thrust bearing, wherein the thrust bearing is defined by the sleeve and a base.

6. The apparatus of claim 1, wherein the fluid channel is defined by opposing rotatable and stationary surfaces.

7. The apparatus of claim 1, wherein the second axially extending portion does not extend above the fluid dynamic bearing.

8. An apparatus comprising:
    a stationary component including a shaft;
    a rotatable component;
    a fluid dynamic bearing defined by the stationary component and the rotatable component;
    a fluid channel including a grooved pump seal;
    a first portion of the fluid channel, wherein the first portion is axially above the fluid dynamic bearing and extending radially outward from the shaft;
    a second portion of the fluid channel, wherein the second portion is radially outside of the fluid dynamic bearing and extends axially downward from the first portion, wherein the first portion and the second portion are both defined by the stationary component and the rotatable component; and
    a recirculation passageway including,
        a first end radially inside of the grooved pump seal, and
        a second end radially outside of a thrust bearing, wherein the thrust bearing is defined by the rotatable component and the stationary component.

9. The apparatus of claim 8, further comprising a capillary seal radially outside of the second portion, wherein the grooved pump seal and the capillary seal are at opposite axial ends of the fluid channel.

10. The apparatus of claim 8, wherein the grooved pump seal, a capillary seal, and the fluid dynamic bearing are positioned axially below the first portion.

11. The apparatus of claim 8, further comprising a thrust bearing defined by the rotatable component and the stationary component.

12. The apparatus of claim 8, wherein the fluid channel is defined by opposing rotatable and stationary surfaces.

13. The apparatus of claim 8, wherein the second portion does not extend above the fluid dynamic bearing.

14. An apparatus comprising:
    a stationary component including a shaft;
    a rotatable component;
    a fluid dynamic bearing defined by the stationary component and the rotatable component;
    a grooved pump seal at a first axial end of the rotatable component and defined by the stationary component and the rotatable component, wherein the grooved pump seal does not extend axially beyond the fluid dynamic bearing;
    a thrust bearing at a second axial end of the rotatable component and defined by the stationary component and the rotatable component; and
    a recirculation passageway including,
        a first end radially inside of the grooved pump seal, and
        a second end radially outside of a thrust bearing, wherein the thrust bearing is defined by the rotatable component and the stationary component.

15. The apparatus of claim 14, further comprising a capillary seal radially outside of the grooved pump seal, wherein the grooved pump seal and the capillary seal are at opposite axial ends of the rotatable component.

16. The apparatus of claim 14, wherein the grooved pump seal, a capillary seal, and the fluid dynamic bearing are positioned axially below a radial fluid channel.

17. The apparatus of claim 14, wherein the thrust bearing defined by a stationary base cup and a rotatable sleeve.

18. The apparatus of claim 14, a fluid channel defined by opposing rotatable and stationary surfaces, wherein the fluid channel includes the grooved pump seal.

19. An apparatus comprising:
a fluid dynamic bearing system defined by a stationary component including a shaft and a rotatable component;
a grooved pump seal at a first end of the fluid dynamic bearing system;
a capillary seal at a second end of the fluid dynamic bearing system, wherein the capillary seal is formed on an axially extending channel between the stationary component and the rotatable component;
a first stationary cup at a first axial end of the shaft;
a second stationary cup at a second axial end of the shaft, wherein concave ends of both the first and second stationary cup face each other; and
a recirculation passageway including,
a first end radially inside of a pump seal, and
a second end radially outside of a thrust bearing, wherein the thrust bearing is defined by the second stationary cup and a sleeve.

20. The apparatus of claim 19 further comprising a journal bearing, wherein the journal bearing and the grooved pump seal occupy the same axial space.

21. The apparatus of claim 19, wherein the grooved pump seal, the capillary seal, and the fluid dynamic bearing system are positioned between the concave ends.

22. The apparatus of claim 19, further comprising a thrust bearing defined by the stationary component and the rotatable component.

23. The apparatus of claim 19 wherein,
the first stationary cup and the shaft are a single unitary component, or
the second stationary cup and the shaft are a single unitary component.

24. An apparatus comprising:
a fluid channel defined by a stationary component including a shaft and a rotatable component, wherein the stationary component and the rotatable component are configured to form a grooved pump seal at a first end of the fluid channel;
a capillary seal at a second end of the fluid channel, wherein the capillary seal is formed on an axially extending channel between the stationary component and the rotatable component;
a first stationary cup at a first axial end of the shaft;
a second stationary cup at a second axial end of the shaft, wherein concave ends of both the first and second stationary cup face each other; and
a recirculation passageway including,
a first end radially inside of the grooved pump seal, and
a second end radially outside of a thrust bearing, wherein the thrust bearing is defined by the stationary component and the rotatable component.

25. The apparatus of claim 24 further comprising a journal bearing, wherein the journal bearing and the grooved pump seal occupy the same axial space.

26. The apparatus of claim 24, wherein the grooved pump seal, the capillary seal, and a fluid dynamic bearing system are positioned between the concave ends.

27. The apparatus of claim 24, further comprising a thrust bearing defined by the stationary component and the rotatable component.

28. The apparatus of claim 24 wherein,
the first stationary cup and the shaft are a single unitary component, or
the second stationary cup and the shaft are a single unitary component.

29. The apparatus of claim 24 further comprising a journal bearing, wherein the journal bearing and the grooved pump seal occupy the same axial space.

30. An apparatus comprising:
a stationary first cup, including grooved pump seal in a first concave end;
a stationary second cup, including a capillary seal in a second concave formed on an axially extending channel between a stationary component and a rotatable component, wherein the first concave end faces the second concave end;
a stationary shaft extending through the first concave end and the second concave end, wherein the stationary shaft and a rotatable component define a fluid dynamic bearing; and
a recirculation passageway including,
a first end radially inside of the grooved pump seal, and
a second end radially outside of a thrust bearing, wherein the thrust bearing is defined by the stationary second cup and a sleeve.

31. The apparatus of claim 30 further comprising a journal bearing, wherein the journal bearing and the grooved pump seal occupy the same axial space.

32. The apparatus of claim 30, wherein the grooved pump seal, the capillary seal, and the fluid dynamic bearing system are positioned between the concave ends.

33. The apparatus of claim 30, further comprising a thrust bearing defined by the stationary second cup and the rotatable component.

34. The apparatus of claim 30 wherein,
the stationary first cup and the stationary shaft are a single unitary component, or
the stationary second cup and the stationary shaft are a single unitary component.

* * * * *